United States Patent [19]

Reifehäuser et al.

[11] Patent Number: 4,756,858
[45] Date of Patent: Jul. 12, 1988

[54] EXTRUDING A THERMOPLASTIC LAMINATE WITH RECYCLED TRIMMINGS

[75] Inventors: Hans Reifehäuser, Troisdorf; Heinz Beisemann, Köln; Clemens Krumm, Neunkirchen-Seelscheid; Hans-Dieter Ott, St. Augustin; Paul Reitemeyer, Troisdorf, all of Fed. Rep. of Germany

[73] Assignee: Reifenhauser GmbH & Co. Maschinenfabrik, Troisdorf, Fed. Rep. of Germany

[21] Appl. No.: 11,880

[22] Filed: Feb. 6, 1987

[30] Foreign Application Priority Data

Feb. 8, 1986 [DE] Fed. Rep. of Germany ....... 3604004

[51] Int. Cl.⁴ .................... B29C 47/06; B29C 47/14
[52] U.S. Cl. ........................ 264/37; 264/171; 264/DIG. 69; 425/131.1; 425/133.5; 425/462
[58] Field of Search ............ 264/37, 171, 176.1, 264/DIG. 69; 425/131.1, 133.5, 462

[56] References Cited

U.S. PATENT DOCUMENTS

| | | | |
|---|---|---|---|
| 3,398,431 | 8/1968 | Corbett | 425/133.5 |
| 3,479,425 | 11/1969 | Lefevre et al. | 264/171 |
| 3,761,211 | 9/1973 | Parkinson | 425/462 |
| 3,924,990 | 12/1975 | Schrenk | 425/462 |
| 4,144,011 | 3/1979 | Sponaugle | 425/133.5 |
| 4,165,210 | 8/1979 | Corbett | 425/462 |
| 4,476,080 | 10/1984 | Komoda et al. | 264/37 |
| 4,533,510 | 8/1985 | Nissel | 264/37 |

Primary Examiner—Jeffery Thurlow
Attorney, Agent, or Firm—Karl F. Ross; Herbert Dubno; Andrew Wilford

[57] ABSTRACT

An apparatus for extruding a thermoplastic laminate has a nozzle assembly having a nozzle body centered generally on a plane and formed at the plane with a merge passage, with an outlet slot opening in one direction from the merge passage, with core-layer distribution and intake passages centered on the plane and opening in the opposite direction into the merge passage, and with cover-layer distribution and intake passages opening laterally into the merge passage. A core-layer fitting formed with tempering chambers forms part of the core-layer intake passage and a trimmings fitting mounted on the nozzle body has a trimmings intake passage and a trimmings feed passage extending therefrom to the cover-layer distribution passage. A liquefied core-layer resin is fed under pressure to the core-layer intake passage and therethrough to the merge passage and outlet slot. Laminate trimmings are also fed under pressure to the trimmings intake passage and therethrough and through the trimmings feed passage to the merge passage, and a liquefied cover-layer resin is fed under pressure to the cover-layer intake passage and therethrough to the merge passage and outlet slot and also to the trimmings feed passage to mix with the liquefied trimmings therein.

6 Claims, 2 Drawing Sheets

EXTRUDING A THERMOPLASTIC LAMINATE WITH RECYCLED TRIMMINGS

FIELD OF THE INVENTION

The present invention relates to a synthetic-resin laminate. More particularly this invention concerns the extrusion of a laminate from a plurality of thermoplastic resins.

BACKGROUND OF THE INVENTION

A standard apparatus for extruding a thermoplastic laminate has a nozzle assembly whose body is centered generally on a plane and formed at the plane with a merge passage, with an outlet slot opening in one direction from the merge passage, with core-layer distribution and intake passages centered on the plane and opening in the opposite direction into the merge passage, and with cover-layer distribution and intake passages opening laterally into the merge passage. A core-layer fitting formed with tempering chambers forms part of the core-layer intake passage. A liquefied core-layer resin, for instance water-impervious PVDC, is fed under pressure to the core-layer intake passage and therethrough to the merge passage and outlet slot and a liquefied cover-layer resin is fed under pressure to the cover-layer intake passage and therethrough to the merge passage and outlet slot trimmings feed passage.

The core resin is normally very temperature sensitive and must also be at the same temperature as the other resins of the laminate to ensure good bonding therewith. In the known devices (*PLASTICS WORLD* August 1984, page 17) the bore of the nozzle body forms the core-resin intake passage and is fitted with a nickel sleeve. Plainly such a metal does not serve to isolate the heat of the stream entering. According to the temperature which the thermoplastifiable resin stream reaches for rheological reasons, the nozzle body gets so hot near the core-resin intake passage that the core resin can be overheated.

In order to avoid this it is known (see German Pat. No. 3,539,767) to form the core-resin intake passage in a fitting which is formed with tempering bores or chambers and which is set in a special seat in the nozzle body. In addition this fitting is formed with intake passages for the cover resins. Preferably the cover-resin intake passages extend along the full length of the tempering chambers.

While such arrangements are fairly effective, they are specifically adapted to only a certain type of operation. In a system where the cured sheet produced is trimmed, such an arrangement cannot make any use of the trimmings thus produced.

OBJECTS OF THE INVENTION

It is therefore an object of the present invention to provide an improved method of and apparatus for forming a thermoplastic-resin laminate.

Another object is the provision of such a method of and apparatus for forming a thermoplastic-resin laminate which overcome the above-given disadvantages, that is which allow the trimmings to be recycled.

SUMMARY OF THE INVENTION

An apparatus for extruding a thermoplastic laminate according to the invention has a nozzle assembly having a nozzle body centered generally on a plane and formed at the plane with a merge passage, with an outlet slot opening in one direction from the merge passage, with core-layer distribution and intake passages centered on the plane and opening in the opposite direction into the merge passage, and with cover-layer distribution and intake passages opening laterally into the merge passage. A core-layer fitting formed with tempering chambers forms part of the core-layer intake passage and a trimmings fitting mounted on the nozzle body has a trimmings intake passage and a trimmings feed passage extending therefrom to the cover-layer distribution passage. A liquefied core-layer resin is fed under pressure to the core-layer intake passage and therethrough to the merge passage and outlet slot. Laminate trimmings are also fed under pressure to the trimmings intake passage and therethrough and through the trimmings feed passage to the merge passage, and a liquefied cover-layer resin is fed under pressure to the cover-layer intake passage and therethrough to the merge passage and outlet slot and also to the trimmings feed passage to mix with the liquefied trimmings therein.

Thus the trimmings are introduced into the process after being temperature conditioned and mixed with the cover resin. Since the trimmings are largely comprised of the cover resin anyhow, this recycling has no perceptible effect on the quality of the product. Thus at the same time a byproduct—the trimmings—that normally has to be discarded is eliminated, and the amount of cover resin needed is also reduced.

According to another feature of this invention the nozzle body is formed with a seat and the trimmings fitting has a collar snugly received therein. In addition the trimmings fitting further has a central tube internally forming the trimmings intake passage and externally forming an annular chamber connected to the cover-resin feed means and in turn opening at an annular mouth into the trimmings feed passage. The tube tapers to a pointed edge at its downstream end. Thus the trimmings will be introduced as a strand, normally from an extruder that comminutes and liquefies them, that is completely surrounded by an annular strand of the cover resin. The core-layer fitting is identically constructed, with the cover layer also being introduced all around it.

In accordance with a further feature of this invention the cover-resin feed means includes a branch passage extending from the cover-layer intake passage to the trimmings feed passage. This makes the apparatus of this invention extremely compact.

The method of this invention therefore comprises the steps of feeding a core resin under pressure as an elongated strip to a merge passage and simultaneously feeding a cover resin under pressure as a pair of elongated strips to the merge passage to sandwich the core-resin strip. The sandwiched strips are ejected from an outlet slot as a laminate that is cured and then trimmed. The trimmings are then liquefied and mixed with the cover-resin strip upstream of the merge passage.

DESCRIPTION OF THE DRAWING

The above and other features and advantages will become more readily apparent from the following, reference being made to the accompanying drawing in which.

SPECIFIC DESCRIPTION

Figure 1:
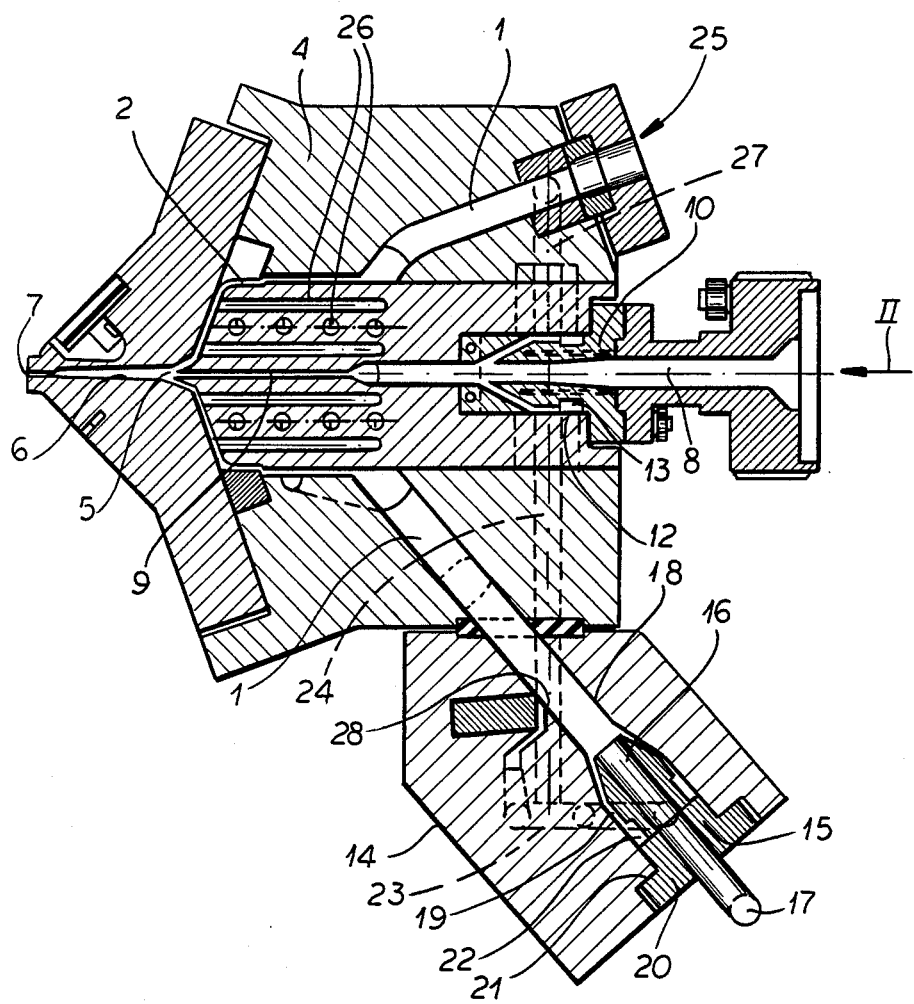
FIG. 1 is a vertical section through the extrusion head according to this invention.
Figure 2:
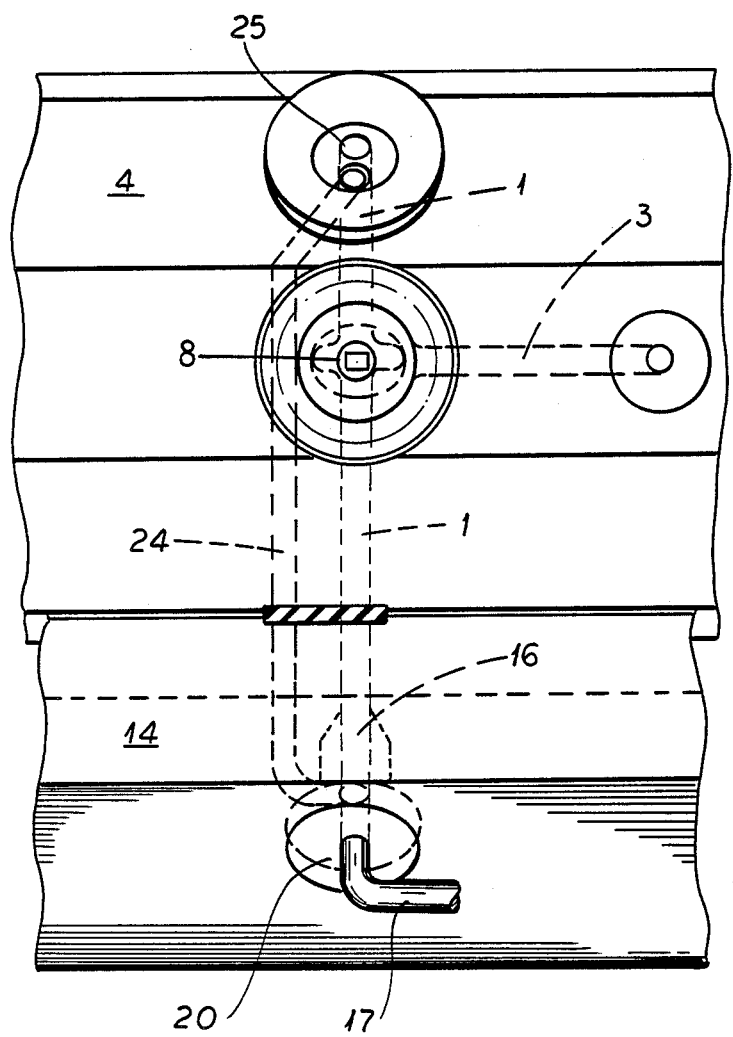
FIG. 2 is an end view taken in the direction of arrow II of FIG. 1.

As seen in FIGS. 1 and 2 the nozzle assembly according to this invention has a main body 4 centered on a horizontal plane 3 and formed with an intake passage 1 and distribution passage 2 for a cover resin. The body 4 includes lips which form a merge chamber 5 into which the passage 2 opens and which is elongated in a direction perpendicular to the plane of the view in FIG. 1. An extrusion chamber 6 of the same shape but smaller width leads from the merge chamber 5 to a thin nozzle slot 7 from which resin emerges as a foil, film, plate, or sheet, depending on thickness. The passages 2 and 6 can be of so-called clothes-line shape.

In addition the body 4 is formed centered on the plane 3 with an intake passage 8 for a core resin and, extending therefrom to the merge passage 5, with a flow passage 9. This intake passage 8 is in part formed by a fitting 10 centered on the plane 3 and formed with tempering bores or chambers extending both around and along this passage 8 and received in a seat 12 formed in the body 4. Similar chambers 26 are formed around the passage 9. In addition opening into the top and bottom of the passage 8 in the fitting 10 is a passage 13 that itself is fed the cover resin via a passage 27 from the intake passage 1.

According to this invention a trimmings-recycling fitting 14 is connected to the lower side of the nozzle body 1 and has a passage 18 opening into the lower leg of the passage 1. This fitting 14 has a nozzle tip 15 formed with a collar 20 received in a seat 21 and forming an intake passage 16 opening into the upstream end of the passage 18. The tip 15 is actually structurally identical to the fitting 10. In addition another lateral branch passage 24 from the cover-resin intake passage 1 opens via a branch 23 into an annular chamber 22 surrounding the tube of the fitting 15 and the passage 24 also opens at 27 into the bottom of this passage 18 downstream of the passage 19.

Figure 3:
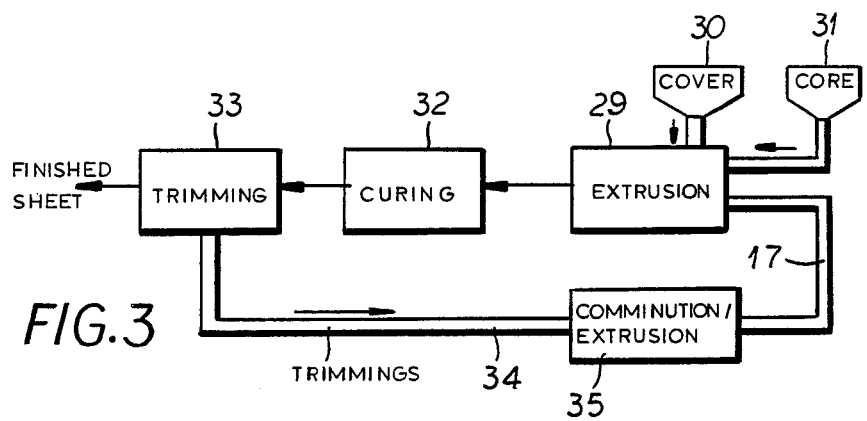
FIG. 3 is a block diagram illustrating the method of this invention.

Thus as seen in FIG. 3 an extruder 29 equipped with the nozzle assembly of FIG. 1 is supplied with a thermoplastic cover resin from a source 30 and with a thermoplastic core resin from a source 31. A sheet is produced which is cured at 32 and which is trimmed at 33. The trimmings thus produced are sent as indicated at 34 to a comminuter/extruder 35 whence they are fed via the conduit 17 to the fitting 15.

These edge trimmings consist mainly of the cover resin and are formed in the nozzle tip 15 into a strand that is first of all surrounded by another strand of the liquefied cover resin from the nozzle passage 19 and thereafter are layered at 28 with another layer of the cover resin, so that they will be perfectly integrated back into the process. Such recycling therefore reuses the otherwise discarded scraps without in any way lessening the quality of the finished product.

We claim:

1. An apparatus for extruding a thermoplastic laminate, the apparatus comprising:
a nozzle assembly having
a nozzle body centered generally on a plane and formed at the plane with a merge passage, with an outlet slot opening in one direction from the merge passage, with core-layer distribution and intake passages centered on the plane and opening in the opposite direction into the merge passage, and with cover-layer distribution and intake passages opening laterally into the merge passage, the core- and cover-layer intake passages extending substantially the full length of an opening along the full length of the merge passage,
a core-layer fitting formed with tempering chambers and forming part of the core-layer intake passage; and
a trimmings fitting mounted on the nozzle body and having a trimmings intake passage and a trimmings feed passage extending therefrom to the cover-layer distribution passage and extending substantially the full length of and opening along the full length of the merge passage, the nozzle body further being formed with a branch passage extending from the cover-layer intake passage to the trimmings feed passage;
means for feeding a liquefied core-layer resin under pressure to the core-layer intake passage and therethrough to the merge passage and outlet slot such that the core resin forms a layer extending the full length of the outlet slot;
means for feeding laminate trimmings under pressure to the trimmings intake passage and therethrough and through the trimmings feed passage to the merge passage; and
means for feeding a liquefied cover-layer resin under pressure to the cover-layer intake passage and therethrough to the merge passage and outlet slot and also from the cover-layer intake passage through the branch passage to the trimmings feed passage to mix with the liquefied trimmings therein and form a layer extending the full layer of the outlet slot.

2. The extruding apparatus defined in claim 1 wherein the nozzle body is formed with a seat and the trimmings fitting has a collar snugly received therein, the trimmings fitting further having a central tube internally forming the trimmings intake passage and externally forming an annular chamber connected to the cover-resin feed means and in turn opening at an annular mouth into the trimmings feed passage.

3. The extruding apparatus defined in claim 2 wherein the tube tapers to a pointed edge at its downstream end.

4. The extruding apparatus defined in claim 1 wherein the branch passage opens annularly around and into the trimmings feed passage, whereby the trimmings in the trimmings feed passage are completely surrounded by the cover resin prior to merging with the core resin.

5. The extruding apparatus defined in claim 1 wherein the trimmings feed means includes an extruder connected to the trimmings intake passage.

6. A method of making a thermoplastic laminate, the method comprising:
feeding a core resin under pressure as an elongated strip to a merge passage;
feeding a cover resin different from the core resin under pressure as a pair of elongated strips to the merge passage to sandwich the core-resin strip and form a three-layer laminate all of whose layers extend the full width of the strip;
ejecting the sandwiched strips from an outlet slot as a laminate;
curing the laminate;
cutting trimmings from the cured laminate, the trimmings including the core and cover resin;
liquefying the trimmings and mixing the liquefied trimmings with the cover-resin strip upstream of the merge passage.

* * * * *